Figure 1:
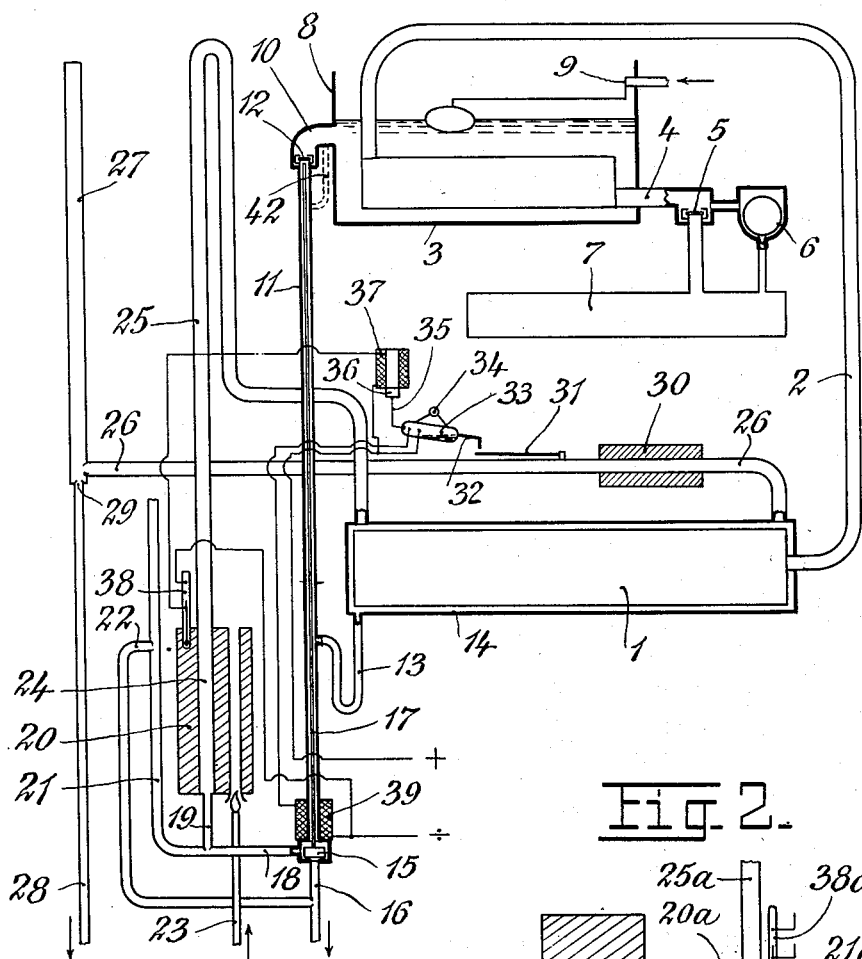

July 23, 1940. I. AMUNDSEN 2,208,716

REFRIGERATING APPARATUS AND METHOD

Filed Jan. 27, 1938

I. Amundsen
Inventor

By Glascock Downing & Seebold
Attys.

Patented July 23, 1940

2,208,716

UNITED STATES PATENT OFFICE 2,208,716

REFRIGERATING APPARATUS AND METHOD

Ivar Amundsen, Bygdo, near Oslo, Norway

Application January 27, 1938, Serial No. 187,310
In Norway January 27, 1937

13 Claims. (Cl. 62—5)

My invention relates to refrigerating plants of the absorption type, of the kind in which a vessel containing an absorbent or an adsorbent is alternately heated and cooled, whereby the refrigerant is alternately expelled from or taken up by the absorbent or adsorbent. During the heating period of the vessel the expelled refrigerant is condensed in a condenser and admitted into an evaporator, from which latter it is evaporated during the cooling period of the vessel, the vapours then being again taken up by the absorbent or adsorbent.

In refrigerating plants of this kind hitherto known the heating of the vessel takes place in such a way, that during the heating period the vessel is supplied with a uniform or substantially uniform quantity of heat, either directly by means of an electric heating element, a gas burner or the like, or indirectly, say by means of steam generated by heating a boiler or the like, distant from the vessel. This arrangement has, however, the drawback, that the source of heat must be switched on and off during the operation of the refrigerating plant. It is the object of my present invention to avoid this drawback and to that effect I make use of a continually heated heat accumulator, from which heat is supplied to the vessel during the heating period of the latter, but no heat is supplied thereto from the accumulator during the cooling period of the vessel.

The transfer of heat is effected by means of a liquid which during the heating period of the generation-absorption vessel is caused to evaporate in the heat accumulator or in a container supplied with heat from said accumulator, the vapour being conducted to the heating device of the generation-absorption vessel, where the vapour is condensed and the condensate is returned to the space of evaporation. During the cooling period of the generation-absorption vessel no supply of heat thereto takes place, the liquid being drawn from the space of evaporation. The temperature in the heat accumulator therefore is continually rising during the cooling period of the generation-absorption vessel, and the accumulator must have sufficient capacity for taking up the quantity of heat supplied thereto during this period.

At the start of the heating period of the generation-absorption vessel, liquid is admitted to the space of vaporization of the heat accumulator, and the evaporation will now be particularly vigorous, the temperature of the space of vaporization being high. This in turn causes a particularly rapid heating of the generation-absorption vessel at the beginning of its heating period, thereby reducing the duration of said period, which is of advantage since no refrigeration effect takes place in the evaporator of the refrigerating plant during this period.

In this connection the invention also comprises an arrangement in the outlet conduit from the heat exchange device of the generation-absorption vessel, with a view to increase the amount of refrigerant being expelled from the absorbent or adsorbent during the heating period.

Further the invention covers different embodiments of the means for reversion of the heating and cooling of the generation-absorption vessel. In accordance with a preferred embodiment, the heating as well as the cooling of the said vessel are effected by means of one and the same heat exchange device, cooling taking place by admitting cooling water to said device and heating by supplying steam generated by heat from the heat accumulator. The reversion from heating to cooling and vice versa of the generation-absorption vessel is effected by means of control means in the water conduit from the cooling plant.

The invention may also be used when the heating and cooling of the generation-absorption vessel is effected by means of two different heat exchange devices, for instance, when said vessel is cooled by means of air.

Figure 2:
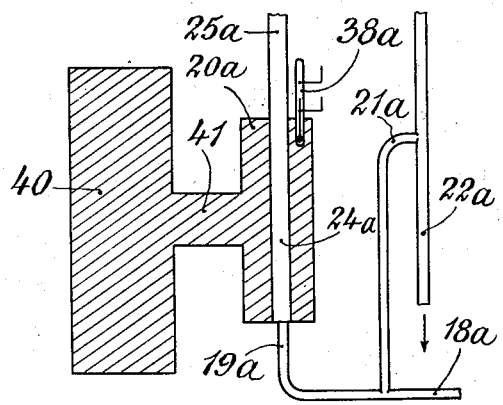
Figure 3:
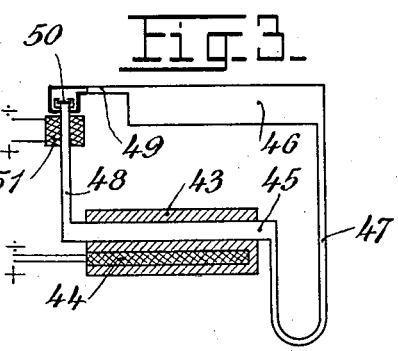

The invention will now be described in detail in connection with the drawing, where:

Figure 1 diagrammatically illustrates a refrigerating plant according to the invention, Figure 2 diagrammatically illustrates a special embodiment of a heat accumulator, and Figure 3 diagrammatically illustrates a method of heating the generation-absorption vessel from the heat accumulator by evaporating and conducting a liquid in a closed system.

In Figure 1 the numeral 1 indicates the vessel containing the absorbent or adsorbent, for instance activated carbon. Said vessel is by means of a conduit 2 connected to the condenser 3. From the bottom of the condenser a pipe 4 leads to a non-return valve 5 and to a float-needle valve 6, both of which are in communication with the evaporator 7. At 8 is indicated a vessel which receives cooling water through a float operated cock 9. When the vessel 1 is heated vaporous refrigerant, for instance methyl alcohol, is driven off and is condensed in the condenser, from which it passes through the float-needle valve 6 to the evaporator 7. Upon cooling of the generation-absorption vessel 1 the refrigerant is evaporated in the evaporator 7 and the vapours pass through the non-return valve to the vessel 1 in which they are absorbed or adsorbed.

The vessel 8 is provided with an outlet 10 connected to a tube 11, the top of which is machined to form a valve seat for a non-return valve 12. The latter is preferably provided with a narrow bore for passage of a small amount of water even when the valve is resting on said seat. A U-shaped conduit 13 is branched off from the tube 11 and leads to a jacket 14 which surrounds the generation-absorption vessel 1. The lower end of tube 11 is machined to form a seat for a valve 15, which latter is provided with a core of iron and in its lowermost position rests on the top of the outlet tube 16, which also is machined to form a valve seat.

Connected to the valve 15 is a rod 17 extending within the tube 11, the top end of which rod being situated just below the non-return valve 12 when the valve 15 is in its lowermost position. From the valve housing which interconnects the tubes 11 and 16 extends a tube 18, having one branch leading to a heat accumulator 20 and another branch 21 which is open at the top and communicates with an outlet 22. Said accumulator may for instance consist of a block of cast iron, which during the operation of the refrigerating plant is continually heated by means of electricity, gas, petrol, oil or in any other suitably way. In the drawing is illustrated an arrangement using gas, which is admitted through a conduit 23. From the top of the space 24 within the accumulator block, which is at its bottom in communication with the tube 19, extends a conduit 25, the other end of which is in connection with the jacket 14. From the other end of the jacket 14 a conduit 26 leads to a tube 27, which is open at its top and extends to a level higher than the highest water level in the vessel 8. From tube 27 a tube 28 leads to the outlet, and in the connection between said tubes is provided a constriction 29, which controls the flow of water to the tube 28.

Surrounding the conduit 26, or forming a part thereof, is a heat absorbing block 30, say of cast iron. To the conduit 26, behind the block 30 as seen in the direction of flow in said conduit, is fastened a member 31 of bi-metal. By upward movement thereof this member acts upon an arm 32, connected to a mercury switch tube 33. Said tube, which is provided with two contact points, is swingably suspended on a stud 34 and carries at its other end an arm 35 having an iron core 36. Said core is attracted by a solenoid 37 when electric current is passing through the latter. In series with said solenoid 37 is a contact thermometer 38 in heat conducting connection with the heat accumulator 20, and in series with the two contact points in the mercury switch tube is a solenoid 39, which surrounds the lowermost part of tube 11.

On the drawing the valves 12 and 15 and the mercury switch tube 33 are shown in their position during the heating period of the generation-absorption vessel. There is water in the vaporization space 24 of the heat accumulator 20, and the steam generated is passing through the conduit 25 to the jacket 14, whereby the generation-absorption vessel is heated. The condensate returns from jacket 14 over 13—11—18—19 to the evaporation space 24. As the heating of the generation-absorption vessel 1 proceeds the steam displaces the air in the space between jacket 14 and vessel 1 and pushes the air through the conduit 26. During the heating period refrigerant is driven off from the absorbent. As no evaporation of refrigerant in the evaporator 7 takes place during this period, it is important that said period be made as short as possible; this is attained by means of the heat accumulator 20 which in a very short time is able to give off to the generation-absorption vessel the heat accumulated during a cooling period. At the same time it is also important, that an effective exhaustion of refrigerant from the absorbent or adsorbent be obtained, in order that the quantity of refrigerant which in a heating period is driven off from the absorbent vessel and in the succeeding cooling period is evaporated in the evaporator 7 shall be as great as possible. The ability of an absorbent or an adsorbent to give off refrigerant in the course of a predetermined period of time and at a predetermined temperature and pressure decreases, however, with decreasing degree of concentration of the refrigerant in the absorbent or adsorbent. In order to obtain an effective exhaustion of refrigerant from the absorbent or adsorbent, in spite of the short heating period obtained by use of the heat accumulator 20, I propose, in accordance with my invention, to provide for a short prolongation of the heating period by means of the heat absorber 30. When the steam in its flow through the conduit 26 reaches the block 30, some of the steam will be used to heat said block, whereby the heating period is prolongated. Only when the heat absorber 30 has been heated to about the temperature of the steam, the latter proceeds in the conduit 26 and now heats the bi-metallic member 31, whereby this is bent upwards and raises the arm 32 of the mercury switch tube 33, so that the latter is swung on its stud 34 until the mercury closes the contact between the two contact points of the switch tube. The electric current thus being lead through the solenoid 39 attracts the iron core of the valve 15, whereby the communication between tubes 11 and 18 is closed and tube 18 is brought in open communication with the outlet 16, and all water in the parts 18—19—24—21 flows to the outlet. Simultaneously the rod 17 raises the valve 12 and water from the vessel 8 flows rapidly through tubes 11 and 13 to the jacket 14, fills up the same and then flows through the conduit 26 and through the constriction 29 to the outlet 28. Due to the rapid cooling of the generation-absorption vessel thus obtained, evaporation of refrigerant starts at once. Also during the cooling period of the vessel 1 the heat accumulator 20 is continuously heated, and as the evaporating space 24, is now empty, the temperature of the accumulator will increase. By suitable arrangement of the contact thermometer 38 and of the capacity and heating of the accumulator 20, the temperature of the accumulator will, after a desired period of time, have risen to a height where an electric circuit is closed between the contact points of the thermometer. The solenoid 37 then receives current and raises the iron core 36, whereby the mercury switch tube 33 is so swung on its stud 34 as to break the circuit through the solenoid 39. Thereby the valves 12 and 15 fall to the positions shown on the drawing, and the water in the jacket 14 rapidly runs out through the tubes 13, 11, 18 and 21 to the outlet 22. Simultaneously water is admitted through tube 19 into the vaporization space 24 of the heat accumulator. As the accumulator is now very hot, said water will rapidly evaporate and cause an intense heating of the generation-absorption vessel 1. Thereby the accumulator 20 cools down, so that the circuit through the contact points in the contact thermometer is again broken, and the solenoid 37 is deenergized. Due to friction on the stud 34 the switch tube 33 is, however, still maintained in position.

The small bore through the valve 12 ensures admission of water to the vaporization space 24 during the heating period of the generation-absorption vessel 1, even if the operation of the refrigeration plant is started with the mercury switch tube 33 in the position indicated in Figure 1, that is, when the operation of the plant is started with a period of heating without water from jacket 14 having been available for filling of the vaporization space 24. Instead of a bore in the valve 12 may also be used a narrow tube 42 (as indicated in dotted lines in Figure 1) which provides for an open communication between vessel 8 and tube 11.

Figure 2 diagrammatically illustrates an embodiment of the heat accumulator and the heating arrangement therefor in case the supply of heat takes place from a continuously heated accumulator which also may serve other purposes, for instance a steam boiler or a heat storing stove. The numeral 40 may for instance indicate an iron accumulator of a heat storing stove which is heated by means of coke. At 20a is indicated the heat accumulator of the refrigerating plant, which at 41 in some suitable manner is in heat-conducting connection with the accumulator 40. The other arrangements and conduits in Figure 2, such as 18a, 19a, &c., corresponds to those indicated by the numerals 18, 19, &c. in Figure 1. The accumulator 20a, the contact thermometer 38a and the connection 41 are so arranged that the cooling period of the absorption vessel will get the desired length at the usual temperature in the accumulator 40.

Instead of controlling the valves and the periods of operation electrically, as illustrated and described, said control may also be effected in other ways, for instance purely mechanically. Thus, instead of the contact thermometer, an expansion rod could be used which is heated from the accumulator 20, and in lieu of the bimetallic member 31, a small vessel containing liquid which upon being heated exerts a vapour pressure upon a membrane or a bellow, may be used. In a manner known per se the impulses from the expansion rod and from the membrane or bellow may be transferred to suitable control means in the water conduit, corresponding to the valves 15 and 12.

In Figure 3 the numeral 43 indicates the heat accumulator, which may be continuously heated by an electric element 44. 45 is the space of vaporization in the accumulator and 46 the heating device for the absorption vessel. The tube 47 connects the bottom of the heating device 46 with the bottom of the space of vaporization 45, the top of which is connected with the heating device by the tubes 48 and 49, the tube 48 having at its top a non-return valve 50, which is being controlled by a solenoid 51. During the heating period of the generation-absorption vessel the electric circuit through the solenoid 51 is broken. The vapour from the evaporating space 45 will then flow through 48—50—49 to the heating device 46, where it is being condensed and the liquid lead back to the evaporating space through tube 47. At the end of the heating period an electric current will by some control means not shown be led through the solenoid 51, thereby stopping the flow of vapour from the evaporating space. The pressure of the vapour will force the liquid out of the space of evaporization to the heating device 46 through the tube 47, and keep it there as long as the solenoid 51 is energized. At the end of the cooling period of the generation-absorption vessel, in which the temperature in the heat accumulator 43 is steadily increasing as no evaporation takes place, the electric circuit through the solenoid 51 will again be broken, thereby allowing the liquid in the heating device 46 to drop down into the space of vaporization 45, where it is again evaporated. The cooling of the generation-absorption vessel and the automatic control of the duration of the heating and cooling periods of the same may be performed in any known way and are not shown on the drawing.

It should be understood that whenever in the appended claims are used the terms generation-absorption or absorption vessel these are intended to cover also generation-adsorption or adsorption vessel, which are obvious equivalents in the present case.

What I claim is:

1. A method of operating a refrigerating plant of the absorption type having a generation-absorption vessel which is alternately heated and cooled, which method includes continually heating a heat accumulator, admitting a liquid into heat exchanging relation thereto so as to vaporize the liquid, conducting the vapour so generated to a heat exchanging means of the generation-absorption vessel to heat the same, interrupting the admission of liquid into heat exchanging relation to the heat accumulator and at the same time cooling the generation-absorption vessel.

2. A method of operating a refrigeration plant of the absorption type having one generation-absorption vessel which is alternately heated and cooled, which method includes continually heating a heat accumulator having such capacity as to accumulate, at substantially increased temperature in the same, the heat supplied thereto during the cooling period of the generation-absorption vessel, said accumulated heat being transferred by means of vapor generated thereby to a heat exchanging device for the generation-absorption vessel during the heating period of the latter together with heat supplied to said heat accumulator during this period.

3. A method of operating a refrigerating plant of the absorption type having one generation-absorption vessel which is alternately heated and cooled, which method includes continually heating a heat accumulator at substantially uniform rate, said accumulator having such capacity as to accumulate, at substantially increased temperature in the same, the heat supplied thereto during the cooling period of the generation-absorption vessel, said accumulated heat being transferred by means of vapor generated thereby to a heat exchanging device for the generation-absorption vessel during the heating period of the latter together with heat supplied to said heat accumulator during this period.

4. A method according to claim 1, which comprises the use of water for generating steam for heating the generation-absorption vessel and the use of water for cooling said vessel.

5. A method according to claim 1 comprising the steps of admitting water into a vaporization space in the continually heated heat accumulator to generate steam for the heating device of the generation-absorption vessel, discontinuing said admission of water, and at the same time drawing off remaining water from said vaporization space and cooling the generation-absorption vessel by means of water.

6. A refrigerating plant comprising a generation-absorption vessel, which is alternately heated and cooled, a condenser and an evaporator, a heating device, a heat accumulator continually heated thereby, means for admitting a liquid into heat exchanging relation to the heat accumulator to vaporize said liquid, means conducting the vapour thus formed into heat exchanging relation to the generation-absorption vessel, means for discontinuing the admission of liquid into heat exchanging relation in the heat accumulator and means for simultaneously cooling the generation-absorption vessel, said heat accumulator being of such capacity as to be able to accumulate all heat supplied thereto by the heating device during the cooling period of the generation-absorption vessel.

7. A refrigeration plant according to claim 6, having means for admittance, during the heating period of the generation-absorption vessel, of water into heat exchanging relation to the accumulator, the same means being adapted to admit cooling water to the generation-absorption vessel during the cooling period of the latter.

8. A refrigeration plant according to claim 6, having a heating and cooling device for the generation-absorption vessel and means interrupting the heating and starting the cooling of the generation-absorption vessel when the temperature in an outlet from said device has risen to a predetermined point.

9. A refrigeration plant according to claim 6, having means interrupting the cooling and starting the heating of the generation-absorption vessel when the temperature of the heat accumulator has risen to a predetermined point.

10. A refrigeration plant according to claim 6, in which the heat accumulator has a vaporizing space therein for vaporization of liquid to generate heating vapour for the generation-absorption vessel.

11. A refrigeration plant comprising an alternately heated and cooled generation-absorption vessel, a condenser and an evaporator, a heating device, a heat accumulator continually heated by said heating device and in heat exchanging relation to a vaporizing space for vaporization of liquid admitted to said space through a conduit, which is at all times open, a vapour conduit from said vaporization space to a heat exchanging device for the generation-absorption vessel, a valve in said conduit, and means for controlling said valve so as to prevent passage of vapour during the cooling period of the generation-absorption vessel but allow passage of vapour during the heating period thereof.

12. A refrigeration plant comprising an alternately heated and cooled generation-absorption vessel, a condenser and an evaporator, a heating device, a heat accumulator continually heated by said heating device and in heat exchanging relation to a vaporizing space for vaporization of liquid admitted to said space through a conduit, means for controlling the flow of liquid through said conduit in such manner that supply of liquid to the vaporization space is allowed only during the heating period of the generation-absorption vessel, and means for drawing off the liquid contained in the vaporization space at the start of each cooling period of the generation-absorption vessel.

13. A refrigeration plant comprising one alternately heated and cooled generation-absorption vessel, a condenser and an evaporator, means for periodically heating said generation-absorption vessel by vapour generated through the medium of a continually heated heat-accumulator, said heat accumulator being in constant heat-conducting relation to another, continuously heated heat accumulator which is adapted to heat also other bodies than the first mentioned heat accumulator.

IVAR AMUNDSEN.